US 6,614,492 B1

(12) United States Patent
Song

(10) Patent No.: US 6,614,492 B1
(45) Date of Patent: Sep. 2, 2003

(54) VERTICAL ALIGNMENT MODE LIQUID CRYSTAL DISPLAY

(75) Inventor: Jang-Kun Song, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 48 days.

(21) Appl. No.: 09/697,153

(22) Filed: Oct. 27, 2000

(30) Foreign Application Priority Data

Oct. 29, 1999 (KR) .............................................. 99-47597

(51) Int. Cl.[7] ..................... G02F 1/1343; G02F 1/1337; H01L 29/04
(52) U.S. Cl. ........................... 349/38; 349/39; 349/130; 349/139; 257/59
(58) Field of Search ........................... 349/38, 39, 130, 349/139, 42; 257/59, 72

(56) References Cited

U.S. PATENT DOCUMENTS 5,666,179 A * 9/1997 Koma ........................ 349/130
6,252,643 B1 * 6/2001 Song .......................... 349/139
6,285,431 B2 * 9/2001 Lyu et al. .................... 349/129

FOREIGN PATENT DOCUMENTS

JP          10-288794 A    * 10/1998

* cited by examiner

Primary Examiner—Tarifur R. Chowdhury
(74) Attorney, Agent, or Firm—McGuireWoods LLP

(57) ABSTRACT

A liquid crystal display includes a bottom insulating substrate. Gate lines and common electrode lines are formed on the substrate parallel to each other, and storage capacitor electrodes are branched from the common electrode lines. A gate insulating layer is formed on the gate lines, the common electrode lines, and the storage capacitor electrodes, data lines are formed on the gate insulating layer, and a protective layer is formed on the data lines. Pixel electrodes are formed on the protective layer with first opening patterns. A top insulating substrate faces the bottom substrate with a black matrix and a common electrode, and the common electrode is provided with second opening patterns. Each pixel electrode completely covers the storage capacitor electrodes at the regions where the second opening pattern is overlapped with the sides of the pixel electrode.

9 Claims, 2 Drawing Sheets

VERTICAL ALIGNMENT MODE LIQUID CRYSTAL DISPLAY

BACKGROUND OF THE INVENTION (a) Field of the Invention

The present invention relates to a vertical alignment mode liquid crystal display and, more particularly, to a vertical alignment mode liquid crystal display having an electrode with opening patterns such that it can accomplish a wide viewing angle.

(b) Description of the Related Art

Generally, a liquid crystal display has a liquid crystal layer sandwiched between two substrates. Electric field is applied to the liquid crystal layer to control light transmission, thereby producing display images.

Among them, the vertical alignment mode liquid crystal displays have been the choice of consumers because they bear a high contrast ratio and a wide viewing angle. The vertical alignment mode liquid crystal display has the directors of the liquid crystal molecules aligned normal to the substrates when the electric field is not applied.

In order to realize a wide viewing angle with such a mode, it has been proposed that opening patterns or protrusions may be formed at electrodes. The opening patterns or protrusions form fringe fields to thereby make the liquid crystal molecules lean in all different directions and accomplish a wide viewing angle.

FIG. 1 is a cross sectional view of a vertical alignment mode liquid crystal display with electrode opening patterns according to a prior art.

The liquid crystal display includes a bottom insulating substrate 100 and a top insulating substrate 600.

Gate lines (not shown) are formed on the bottom insulating substrate 100 with gate electrodes in the horizontal direction. Common electrode lines (not shown) are formed on the bottom substrate 100 while proceeding parallel to the gate lines, and storage capacitor electrodes 230 and 240 are connected to the common electrode lines perpendicularly. A gate insulating layer 310 is formed on the entire surface of the bottom substrate 100 with the gate lines and the common electrode lines. Data lines 400 are formed on the gate insulating layer 310 in the vertical direction, and a protective layer 320 covers the data lines 400. Pixel electrodes 500 are formed on the protective layer 320 with opening patterns 510.

The outlines of the pixel electrodes 500 are partially overlapped with the storage capacitor electrodes 230 and 240 such that the storage capacitor electrodes 230 and 240 are partially exposed along the periphery of the pixel electrodes 240 when viewed from the top side.

In contrast, the top insulating substrate 600 is sequentially overlaid with a black matrix 700 and a transparent common electrode 800 having opening patterns 810.

The liquid crystal display further includes several components that are not shown in the drawing for simplification and convenience in description. For instance, thin film transistor components such as source and drain electrodes, and a semiconductor layer are formed on the bottom substrate 100. Color filters are formed on the top substrate 600.

However, in the above-structured liquid crystal display, an unintended reverse turn in orienting directions of the liquid crystal molecules may occur at the pixel area, causing T textures in screen images that harm the picture quality.

SUMMARY OF THE INVENTION

It is an object of the present invention to provide a liquid crystal display, which bears improved picture quality.

This and other objects may be achieved by a liquid crystal display with a bottom insulating substrate. Common electrode lines are formed on the bottom substrate with branched electrodes. Pixel electrodes are insulated from the common electrode lines with first opening patterns. The pixel electrodes completely cover the branched electrodes of the common electrode lines at particular regions when viewed from the top side.

A top insulating substrate faces the bottom substrate with a common electrode. The common electrode is provided with second opening patterns, and the second opening patterns are overlapped with sides of the pixel electrodes at the particular regions where the pixel electrodes completely cover the branched electrodes of the common electrode lines.

The branched electrodes may be provided at left and right sides of each pixel electrode one by one, and the common electrode lines may be two separate lines.

Each first opening pattern has a horizontal opening portion formed at the boundary of the pixel electrode bisecting it into upper and lower regions, and inclined opening portions are formed at the upper and lower regions of the pixel electrode while proceeding perpendicular to each other. Each second opening pattern has inclined opening portions externally proceeding parallel to the upper and lower inclined opening portions of the pixel electrode, and linear opening portions are bent from the inclined opening portions while being overlapped with the sides of the pixel electrode. The linear opening portions of the second opening pattern are overlapped with the vertical sides of the pixel electrode at the particular regions where the pixel electrode completely covers the branched electrodes of the common electrode lines.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of this invention will be explained with reference to the accompanying drawings.

Figure 3:
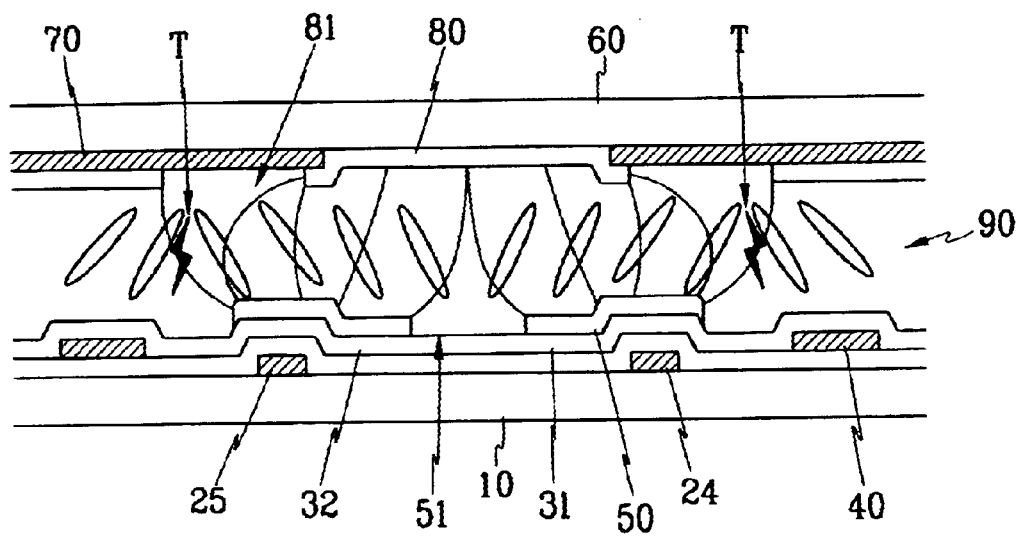
FIG. 3 is a cross sectional view of the vertical alignment mode liquid crystal display taken along the III–III' line of FIG. 2.
Figure 2:
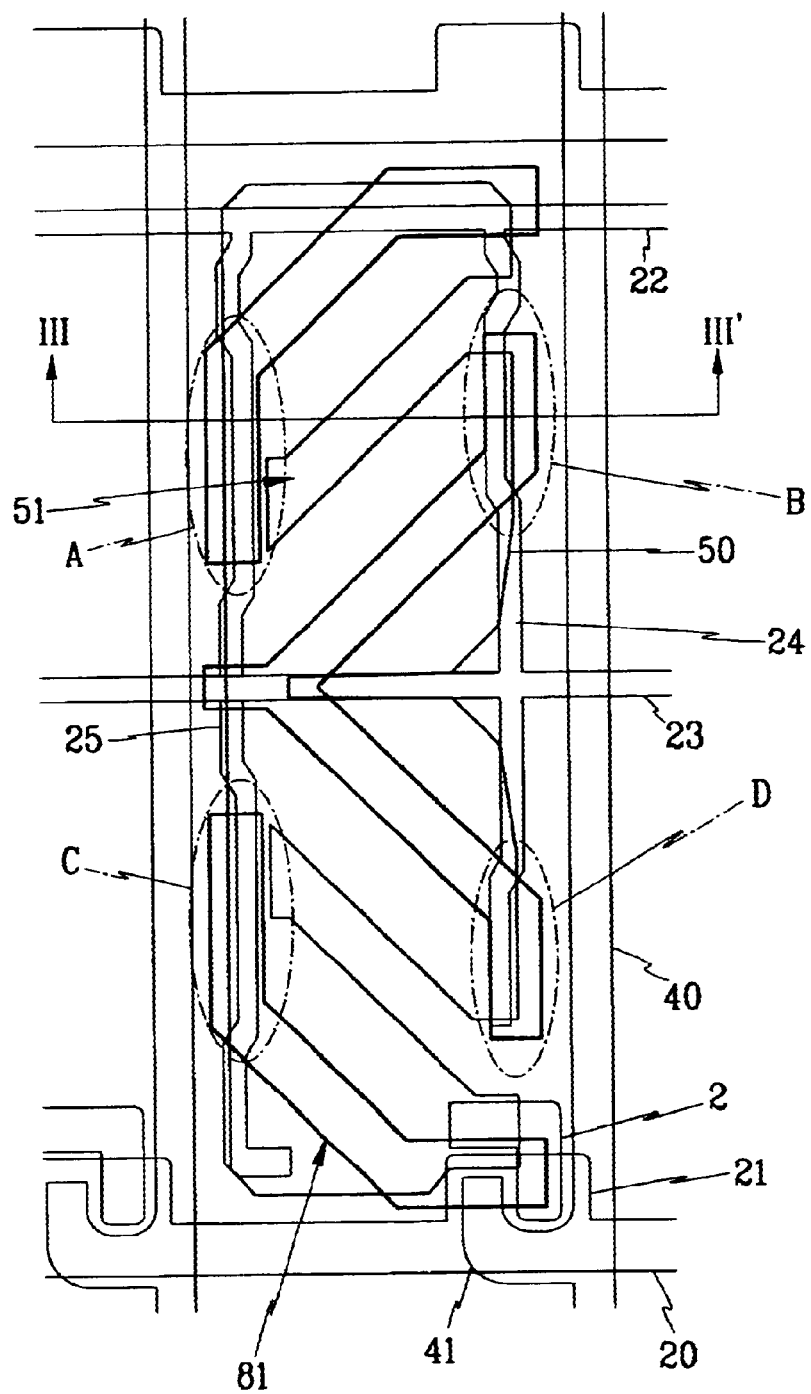
FIG. 2 is a plan view of a vertical alignment mode liquid crystal display with electrode opening patterns according to a preferred embodiment of the present invention.

FIG. 2 schematically illustrates a vertical alignment mode liquid crystal display with electrode opening patterns according to a preferred embodiment of the present invention, and FIG. 3 is a cross sectional view of the vertical alignment mode liquid crystal display taken along the III–III' line of FIG. 2.

As shown in the drawings, the liquid crystal display includes a bottom insulating substrate 10 usually called the "thin film transistor (TFT) array substrate," and a top insulating substrate 60 usually called the "color filter substrate."

Gate lines 20 are formed on the bottom substrate 10 with gate electrodes 21 while proceeding in the horizontal direction. Common electrode lines 22 and 23 are formed on the bottom substrate 10 parallel to the gate lines 20, they are connected to each other via storage capacitor lines 24 and 25 proceeding in the vertical direction and there may be one, three or more of them. The gate lines 20, the gate electrodes 21, the common electrode lines 22 and 23, and the storage capacitor electrodes 24 and 25 may be formed with a metallic material such as aluminum or chrome while bearing either a single-layered structure or a double-layered structure sequentially formed with a chrome-based layer and an aluminum-based layer.

A silicon nitride-based gate insulating layer 31 is formed on the gate lines 20, the common electrode lines 22 and 23, and the storage capacitor electrodes 24 and 25.

Data lines 40 are formed on the gate insulating layer 31 in the vertical direction. Source electrodes 41 are branched from the data lines 40, and drain electrodes 42 are positioned close to the source electrodes 41 while being separated from them. The data lines 40, the source electrodes 41, and the drain electrodes 42 are formed with a metallic material such as chrome or aluminum, with either a single or multiple-layered structure.

A semiconductor layer (not shown) for the channel portion of the TFT, and an ohmic contact layer (not shown) for reducing contact resistance between the semiconductor layer and the source and drain electrodes 41 and 42 are formed under the source and drain electrodes 41 and 42. The semiconductor layer is usually formed with amorphous silicon, and the ohmic contact layer is formed with amorphous silicon doped with n-type impurities in high concentration.

A protective layer 32 is formed on the data lines 40 with an inorganic insulating material such as silicon nitride or an organic insulating material such as resin. The protective layer 32 is provided with contact holes (not shown) opening the drain electrodes 42.

Pixel electrodes 50 are formed on the protective layer 32 with opening patterns 51. The pixel electrodes 50 are formed of a transparent conductive material such as indium tin oxide (ITO) or indium zinc oxide (IZO), or an opaque conductive material such as aluminum that exhibits a good light reflection property.

The opening pattern 51 of each pixel electrode 50 has a horizontal opening portion formed at the boundary of the pixel electrode 50 bisecting it into upper and lower regions, and inclined opening portions formed at the upper and lower regions of the pixel electrode 50 while proceeding perpendicular to each other, thereby uniformly distributing fringe fields in all directions.

The storage capacitor electrodes 24 and 25 are completely covered by the pixel electrode 50 at the A, B, C and D portions when viewed from the top side.

A black matrix 70 is formed at the top insulating substrate 60 to prevent leakage of light. A common electrode 80 is formed on the black matrix 70 with opening patterns 81. The common electrode 80 is formed with a transparent material such as ITO or IZO. Color filters (not shown) are formed at the top substrate 60 while being surrounded by the black matrix 70. Alternatively, the black matrix 70 and the color filters may be formed at the bottom substrate 10.

The opening pattern 81 of the common electrode 80 at a pixel area has inclined opening portions that externally proceed parallel to the upper and lower inclined opening portions of the pixel electrode 50, and linear opening portions bent from the inclined opening portions while being overlapped with the sides of the pixel electrode 50. The linear opening portions are classified into horizontal and vertical linear opening portions. The sides of the pixel electrode 50 overlapped with the vertical linear opening portions completely cover the underlying storage capacitor electrodes 24 and 25.

In the above-structured liquid crystal display, textures can be effectively prevented in the following way.

Figure 1:
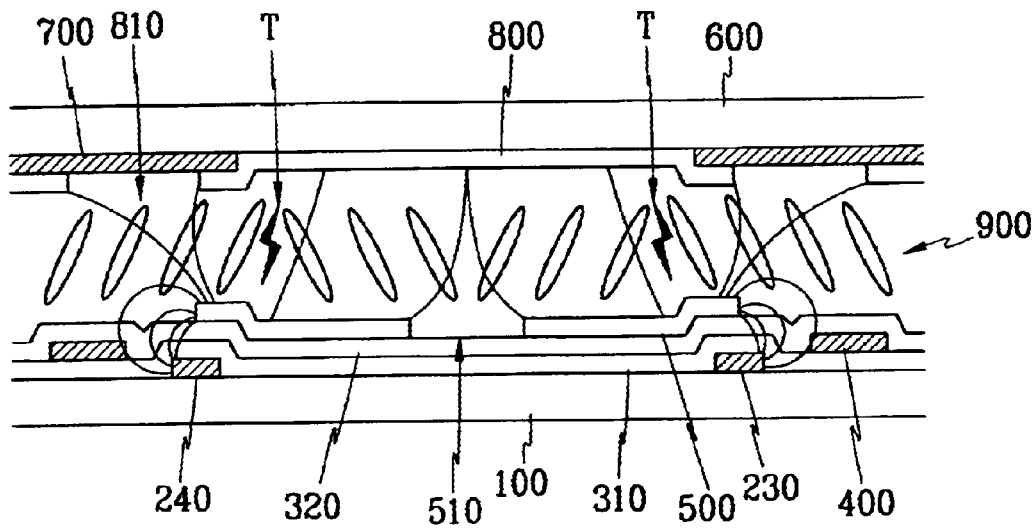
FIG. 1 is a cross sectional view of a vertical alignment mode liquid crystal display with electrode opening patterns according to a prior art.

In the conventional liquid crystal display shown in FIG. 1, a strong electric field is formed between the pixel electrode 500 and the storage capacitor electrodes 230 and 240 while influencing the electric field formed at the periphery of the pixel area. Such an influence of the electric field is particularly prominent at the A, B, C and D portions of the pixel area where the common electrode 80 is removed and the opening pattern 81 is formed. For that reason, the fringe field formed at the periphery of the pixel area is inclined in a direction opposite to the direction of the fringe filed formed at the center of the pixel area. Therefore, the orienting directions of the liquid crystal molecules are reverse-turned at the region T between the periphery and the center of the pixel area. Such a region T is displayed at the screen as a texture.

By contrast, in the inventive liquid crystal display shown in FIG. 3, the pixel electrode 50 completely covers the storage capacitor electrodes 24 and 25. Therefore, most of the electric lines of force formed between the pixel electrode 50 and the storage capacitor electrodes 24 and 25 are connected to the bottom surface of the pixel electrode 50. Consequently, the electric field between the pixel electrode 50 and the storage capacitor electrodes 24 and 25 does not influence the liquid crystal molecules. The fringe fields that are not influenced by the storage capacitor electrodes 24 and 25 are kept in a predetermined direction within the pixel area, and vary in direction out of the pixel area (while being covered by the black matrix). As the region T where the orienting direction of the liquid crystal molecules is reverse-turned falls out of the pixel area and is covered by the black matrix, hiding textures from the screen.

As described above, the inventive liquid crystal display prevents occurrence of textures in an effective manner so that picture quality can be significantly improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array substrate for a liquid crystal display, comprising:

an insulating substrate;

a gate line formed on the substrate;

a common electrode line proceeding parallel to the gate line;

a storage capacitor electrode connected to the common electrode line;

a gate insulating layer formed on the gate line, the common electrode line, and the storage capacitor electrode;

a data line formed on the gate insulating layer;

a protective layer formed on the data line; and a pixel electrode formed on the protective layer with opening patterns, wherein the pixel electrode covers entire width of the storage capacitor electrodes at particular regions, and wherein each opening pattern comprises a horizontal opening portion formed at the boundary of the pixel electrode bisecting the pixel electrode into an upper region and a lower region, and inclined opening portions formed at the upper region and the lower region of the pixel electrode while proceeding perpendicular to each other.

2. The thin film transistor array substrate of claim 1, wherein the storage capacitor electrode is respectively provided at left side and right side of each pixel electrode.

3. The thin film transistor array substrate of claim 1, wherein the common electrode line comprises two separate lines.

4. A thin film transistor array substrate, comprising:

an insulating substrate;

a common electrode line with branched electrodes, said common electrode line being formed on the insulating substrate; and a pixel electrode insulated from the common electrode line and having first opening patterns, wherein the pixel electrodes cover entire width of the branched electrodes of the common electrode lines at particular regions when viewed from a top side, and wherein each opening pattern comprises a horizontal opening portion formed at the boundary of the pixel electrode bisecting the pixel electrode into an upper region and a lower region, and inclined opening portions formed at the upper region and the lower region of the pixel electrode while proceeding perpendicular to each other.

5. A liquid crystal display, comprising:

a bottom insulating substrate;

a common electrode line with branched electrodes, said common electrode line being formed on the bottom insulating substrate;

a pixel electrode insulated from the common electrode line and having first opening patterns, the pixel electrodes completely covering the branched electrodes of the common electrode line at particular regions when viewed from the top side;

a top insulating substrate facing the bottom substrate; and a common electrode formed on the top substrate with second opening patterns, wherein the second opening patterns are overlapped with sides of the pixel electrode at the particular regions where the pixel electrode completely cover the branched electrodes of the common electrode lines.

6. The liquid crystal display of claim 5, wherein the branched electrodes are respectively provided at a left side and a right side of each pixel electrode.

7. The liquid crystal display of claim 5, wherein the common electrode line comprises two separate lines.

8. The liquid crystal display of claim 5, wherein each first opening pattern comprises a horizontal opening portion formed at the boundary of the pixel electrode bisecting the pixel electrode into an upper region and a lower region, with inclined opening portions formed at the upper region and the lower regions of the pixel electrode while proceeding perpendicular to each other, each second opening pattern comprising inclined opening portions externally proceeding parallel to the upper and lower inclined opening portions of the pixel electrode, and linear opening portions bent from the inclined opening portions while being overlapped with the sides of the pixel electrode.

9. The liquid crystal display of claim 8, wherein the linear opening portions of the second opening pattern are overlapped with the vertical sides of the pixel electrode at the particular regions where the pixel electrode completely covers the branched electrodes of the common electrode lines.

* * * * *

UNITED STATES PATENT AND TRADEMARK OFFICE
CERTIFICATE OF CORRECTION

PATENT NO. : 6,614,492 B1
DATED : September 2, 2003
INVENTOR(S) : Jang-Kun Song

It is certified that error appears in the above-identified patent and that said Letters Patent is hereby corrected as shown below:

Title page,
Item [30], Foreign Application Priority Data, change "99-47597" to -- 99-47567 --.

Signed and Sealed this

Twenty-third Day of December, 2003

JAMES E. ROGAN
*Director of the United States Patent and Trademark Office*